US012304232B1

(12) United States Patent
Jager et al.

(10) Patent No.: US 12,304,232 B1
(45) Date of Patent: May 20, 2025

(54) MULTI-CARTRIDGE PEN DEVICES AND WRITING INSTRUMENTS

(71) Applicant: ZUMEDIA INC., New York, NY (US)

(72) Inventors: Phyllis Jager, New York, NY (US); Barry Terach, New York, NY (US); Mark Cuban, New York, NY (US)

(73) Assignee: ZuMedia Inc., New York, NY (US)

( * ) Notice: Subject to any disclaimer, the term of this patent is extended or adjusted under 35 U.S.C. 154(b) by 0 days.

(21) Appl. No.: 18/510,192

(22) Filed: Nov. 15, 2023

(51) Int. Cl.

| | |
|---|---|
| ***B43K 7/04*** | (2006.01) |
| ***B43K 27/04*** | (2006.01) |
| ***B43K 27/08*** | (2006.01) |
| ***B43K 27/12*** | (2006.01) |

(52) U.S. Cl.
CPC ................ *B43K 7/04* (2013.01); *B43K 27/04* (2013.01); *B43K 27/08* (2013.01); *B43K 27/12* (2013.01)

(58) Field of Classification Search
CPC ........ B43K 7/04; B43K 27/00; B43K 27/003; B43K 27/006; B43K 27/02; B43K 27/04; B43K 27/12; B43K 27/08
USPC .......................................... 401/6, 34, 35, 28
See application file for complete search history.

(56) References Cited

U.S. PATENT DOCUMENTS

| | | | | | |
|---|---|---|---|---|---|
| 2,449,939 | A * | 9/1948 | Heyberger | B43K 27/12 | 401/35 |
| 3,352,621 | A * | 11/1967 | Fehling et al. | B43K 24/02 | 401/109 |
| 6,685,373 | B1 * | 2/2004 | Liu | B43K 8/003 | 401/35 |
| 6,953,296 | B1 * | 10/2005 | Vora | B43K 27/08 | 401/35 |
| 6,960,039 | B2 * | 11/2005 | Sieling | B43K 8/24 | 401/35 |
| 11,738,588 | B2 * | 8/2023 | Nielson | G06F 3/03545 | 401/99 |
| 2004/0001737 | A1 * | 1/2004 | Giron | B43K 7/005 | 401/35 |
| 2008/0219746 | A1 * | 9/2008 | Lee | B43K 1/00 | 401/6 |
| 2009/0154983 | A1 * | 6/2009 | Khoshnevis | B43K 8/03 | 401/196 |

* cited by examiner

*Primary Examiner* — David J Walczak
(74) *Attorney, Agent, or Firm* — Tarter Krinsky & Drogin LLP

(57) ABSTRACT

A writing instrument such as a pen or stylus, that is capable of writing contemporaneously in different physical characteristics, such as color and visual appearance—that is, without the need to switch out different cartridges to write in different characteristics; as well as to an ink device for such a writing instrument, such as a multi-cartridge tip having multiple nibs, where the multiple nibs can be used to write on a substrate contemporaneously. A writing instrument herein can be configured to write at a substantially perpendicular angle to the substrate, or slightly angled for ease of a user's hand position. A writing instrument that encompasses both electronic and manual (ink) features is also contemplated.

13 Claims, 3 Drawing Sheets

MULTI-CARTRIDGE PEN DEVICES AND WRITING INSTRUMENTS

BACKGROUND

The present technology relates to a writing instrument such as a pen or stylus, that is capable of writing in different colors at once, and to an ink device for such a writing instrument, such as a multi-cartridge tip having multiple nibs. A multi-cartridge tip herein can provide for various nibs and writing instrument types, including soft tip, ball point, plastic nib, or other known pen types.

Writing instruments such as pens and styluses are typically configured to have an elongated main body having a proximal end (closer to a writing surface during use) and an opposite distal end. The main body generally can have one or more orifices for holding a nib at the proximal end that is joined to an ink cartridge.

A typical pen tip is generally frusto-conical, the diameter of which decreases as it extends toward the proximal end; and can provide for a single opening at the proximal end that a proximal end of a nib can extend through, to contact the writing surface, and a pen nib that is at least partially housed within the tip and protrudes out of the tip to contact the writing surface (in the case of a ball point pen, or felt or marker pen) or which may not be housed within a tip at all (in the case of a fountain pen, where the nib is mostly or entirely exposed).

A pen nib can be a ball point, soft tip, fountain, or other type of pen nib. A ball point pen nib commonly has a channel for ink to pass through from a cartridge of ink, although a soft point or felt or marker pen might not use a nib, or its soft point can be called a nib herein. A pen can have a cartridge, generally in the form of a capsule for holding ink; or the cartridge can be a soft filament material for holding ink. The cartridge allows the ink to pass into the nib or soft point and onto a writing surface. A soft tip type marker might not include a capsule-like cartridge; instead, it can use filament material to hold the ink. In such case, the filament material typically ends in the soft point at the proximal end, and such soft nib will extend through a tip that holds the proximal end of the soft material. A stylus can have a nib that is an end adapted for transferring a signal to a touch screen or surface.

A multicolor pen can include multiple cartridges of the same variety of pen nibs in different colors, e.g., blue, green, red, black, purple, or any color ball point pens. The pen tip allows for a single nib to protrude at any given time for writing in a single color. Typically, with such multicolor pens, and in particular with ball point pens, the barrel is configured to hold multiple ink cartridges with multiple nibs of different colors, such that the nib of the desired color cartridge may be pushed out of a housing and brought into writing position by suitable manipulation, while the previously used nib and cartridge is returned to a rest position in the housing. This can have an artistic, aesthetic or otherwise desirable result for the user.

However, known multicolor pen devices are generally limited in that a user can deploy only one cartridge (and consequently, only one tip having one color) for writing at a given time. Moreover, long-term manipulation of known pen devices eventually leads to mechanical failure.

An ongoing need exists for a device that permits a user to write with multiple nibs at the same time, without the need to change different nibs, but still providing a desirable aesthetic effect. Further, it is desirable for such configurations to be easy to use, reliable, provide a reliable flow of ink, affordable, and easy to carry.

SUMMARY

In certain embodiments, the present technology is directed to an ink device for a writing instrument having a barrel, the ink device being configured to be enclosed within the barrel, the ink device comprising: (a) two or more ink cartridges, each of the ink cartridges containing ink; each of the ink cartridges having a proximal end and an opposite distal end; and (b) two or more nibs, each nib connected to the proximal end of an ink cartridge; wherein the ink device is configured such that, when placed within the barrel of the writing instrument, the plurality of nibs extend through the proximal end of the barrel and transfer the ink from the cartridges to a substrate contemporaneously, providing a discernible effect of two or more characteristics.

In certain embodiments, the present technology is directed to a writing instrument comprising: a tip, the tip tapering from a first diameter to a second, narrower diameter; two or more ink cartridges disposed within the tip, each of the ink cartridges comprising a proximal end connected to or integrated with a nib configured to transfer ink from within the two or more ink cartridges to a substrate, and each of the ink cartridges having a different physical characteristic from the at least one other ink cartridge; wherein the writing instrument is configured such that, when the two or more nibs are contacted with a substrate, the plurality of nibs extend through the proximal end of the tip and transfer the ink from the cartridges to a substrate contemporaneously, providing a discernible effect of two or more physical characteristics.

In certain embodiments, each nib comprises an axial opening that is angled such that the axial opening is substantially parallel to the surface of a substrate when the writing instrument is held at an angle of 30 to 150 degrees relative to the surface of the substrate.

In certain embodiments, the present technology is directed to a writing instrument comprising: (a) a barrel having a proximal end and a distal end, the proximal end connected to or integrated with a tip, the tip tapering from a first, wide diameter substantially equal to the diameter of the proximal end of the barrel, to a tip end having a second, narrow diameter; (b) two or more ink cartridges disposed within the barrel, each of the ink cartridges comprising a proximal end connected to or integrated with a nib configured to transfer ink from within the two or more ink cartridges to a substrate; and (c) two or more nibs, each nib connected to the proximal end of an ink cartridge and extend through the proximal end of the barrel; wherein the writing instrument is configured such that, when the two or more nibs are contacted with a substrate, the plurality of nibs transfer the ink from the cartridges to a substrate contemporaneously, providing a discernible effect of two or more physical characteristics.

In certain embodiments the writing instrument is directed to a substantially triangular tip; and two or more ink cartridges comprising a proximal end and a distal portion, the proximal end disposed within the tip. The tip is configured to contemporaneously transfer ink from the two or more ink cartridges to a substrate, each of the ink cartridges having a different physical characteristic from the other ink cartridge. A further embodiment comprises the feature wherein the proximal ends of the ink cartridges are at a substantially perpendicular angle to the distal portions of the ink cartridges.

In certain embodiments the present technology is directed to a writing instrument comprising two or more styluses configured to contemporaneously transfer a signal to a signal receiving substrate. The signal receiving substrate can be a touch screen on a phone, laptop, computer, tablet, or other digital device. The stylus can comprise a rod with at least one end provided to transfer a signal to the substrate that a writing is taking place. The stylus can comprise two or more ends. A writing can comprise digital ink or digital paint or other known digital technologies used for writing or drawing on a digital device. A rod can be of various materials, e.g., paper, wood, glass, metal, fabric, polymer (such as plastic), or a combination of those.

In certain embodiments, a writing instrument herein, whether or not configured to use digital ink or a signal, comprises a barrel, and the two or more styluses are disposed within the barrel. In certain embodiments the present technology comprises a stylus with two or more ends.

In certain embodiments, the present technology is directed to methods for writing on a substrate, comprising contacting a plurality of nibs as described herein with the substrate for a period of time sufficient for ink to flow from a writing instrument herein through the nibs and onto the substrate.

DETAILED DESCRIPTION

Figure 1:
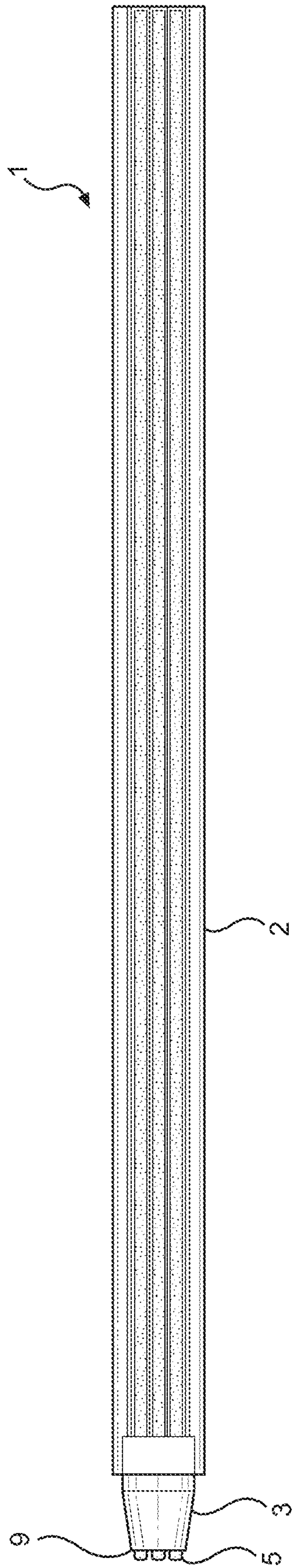
FIG. 1 shows an embodiment of a writing instrument and ink device as described herein, illustrating three (of five) cartridges, a tip, and balls of a ballpoint nib.

As used herein, "writing instrument" means any instrument that is held in the hand and that can be used to write on a substrate. A writing instrument can mean, for example, a pen, a marker, a stylus, or any similar instrument that is configured to be used with ink.

As used herein, "cartridge" means any structure that is configured to hold ink, in the form of a reservoir that can be inserted into a writing instrument and used to write as the ink flows from the cartridge and through the nib onto the substrate.

As used herein, "substrate" or "writing substrate" means any material on which a writing instrument can write. This can mean, for example, a piece of paper or fabric, or a hard surface such as a wall or floor, and any material including wood, stone, concrete, cement, glass, metal, or any polymeric material including plastic or the like. A substrate can also mean a screen of a digital touch surface or a surface capable of transferring touch to a digital signal for purposes of writing or drawing, e.g., touchscreen of a tablet, phone, or laptop.

As used herein, "substantially" means within 25% of a value. "Substantially horizontal" means within 25% of perfectly horizontal, and "substantially vertical" means within 25% of perfectly vertical. "Substantially perpendicular" or "substantially orthogonal" are interchangeable, and mean within 25% of a 90 degree angle, i.e., 67.5 to 99 degrees.

As used herein, when referring to a material, "opaque" means not allowing light to pass through, such that items on the other side of the material cannot be seen by the naked eye, either in outline or in detail.

As used herein, "translucent" means allowing some light to pass through without significant scattering of light, such that items on the other side of a material can be seen by the naked eye, but not clearly—that is, can be seen in outline, but not in detail.

As used herein, "transparent" means allowing light to pass through without substantial scattering of light, such that items on the other side of a material can be seen clearly by the naked eye—that is, both in outline and in detail.

As used herein, the terms "wide" or "wider" are used to denote relativity to the terms "narrow" or "narrower." When referring to a "wide" or "wider" diameter" this is used to specify that a particular diameter is wider than a "narrow" or "narrower" diameter, without regard for specific dimensions, other than to the extent they compare to each other.

As used herein, all singular terms refer to both singular and plural values. That is, "a" or "an" or "the" all mean "one or more." The term "or" as used herein means any one or more of the alternatives, including all of the alternatives.

Throughout the present disclosure, when described in sequential words (for example, using "then" or "next"), such description is not limiting to the described steps in the particular order set forth, but also includes embodiments wherein the steps are presented in any order. Throughout the present disclosure, the use of the word "user" not limited to a particular person or persons, but can indicate actions performed by a machine, computer, a robot, or artificial intelligence (A.I.)

Various embodiments herein refer to an "ink device." As used herein, "ink device" can refer to any unit made up of multiple parts, for example, a bundle of ink cartridges or styluses held together (that can, in various embodiments, be configured together or otherwise associated generally as a bundle, but are not necessarily physically connected to each other). In certain embodiments, a device herein can comprise a plurality of ink cartridges disposed within a barrel of a writing instrument, and essentially fitted together by their nibs' being inserted into one or more holes in a tip of the writing instrument, as will be discussed in greater detail herein.

Barrel and Tip

In certain embodiments, a writing instrument herein comprises a barrel, which is essentially a hollow tube that can encase one or more cartridges, and around which a user's hand can fit to use the writing instrument. For example, as shown in FIG. 1, in certain embodiments, a writing instrument 1 comprises a barrel 2 having a proximal end ending in a tip 3, and an opposite distal end. As used herein, "tip" refers to the portion of the writing instrument in which the one or more nibs or soft points are at least partially housed and which sits close to the substrate when the writing instrument is in use by the user. In the embodiments shown in, for example, FIG. 1 and FIG. 8, the tip is frusto-conical, although the tips described herein are not so limited. For example, as shown in FIG. 5 through FIG. 7 and FIG. 9 through FIG. 11, in certain embodiments, the tip is substantially triangular, or substantially trapezoidal. Further, as shown in FIG. 8 through FIG. 11, in certain embodiments, a tip herein can be translucent or transparent, such that a user can see the outline or details of the various nibs within the writing instrument, for desirable visual effect.

Figure 4:
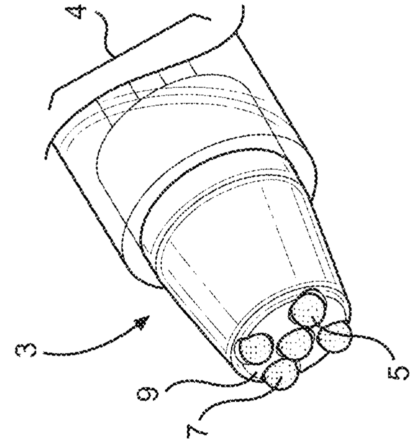
FIG. 4 is a 3-dimensional perspective view of an embodiment herein, including a tip with the balls of a ballpoint pen.

In various embodiments, the tip can be integral with the barrel, or can be a separate element that is connected to the barrel, as can be assembled during manufacture of the writing instrument—for example, snapped on, glued on or screwed on. In various embodiments, for example as shown in FIG. 1 and FIG. 4, a tip 3 herein has a diameter 4 that decreases from where it contacts the proximal end of the barrel 2, to the tip end 9, the point where a nib 5 protrudes. In certain embodiments, the tip 3 is frusto-conical, the diameter of which decreases (tapers) as it extends toward the tip end 9, which is the farthest point on the proximal end of the tip 3. In other embodiments, for example as shown in FIG. 5 through FIG. 7 and FIG. 9 through FIG. 11, the tip 3 has a wide enough diameter at the tip end 9 (its point closest to the writing substrate), such that it can accommodate an angling of the multiple pen nibs or soft points when a writer uses the writing instrument to write on a substrate, such as the horizontal surface of a piece of paper on a desk; thus, when the writer holds the pen in the typical writing position, two or more of the multiple nibs 5 can all touch the substrate at substantially the same pressure, or at substantially different pressure (depending on the writing effect desired by the user). In such embodiments, using such a writing instrument can be ergonomically comfortable for the user.

Figure 3:
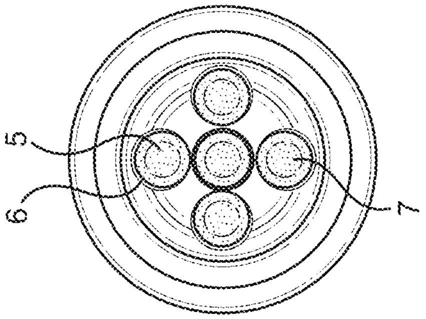
FIG. 3 shows an embodiment of a writing instrument and ink device as described herein, showing the tip, and balls of a ball point nib.
Figure 2:
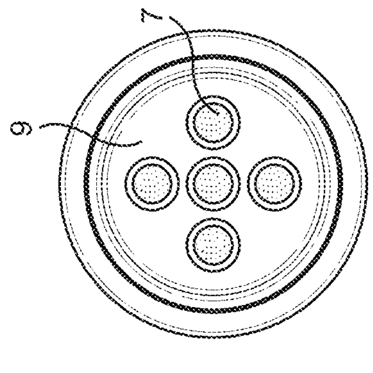
FIG. 2 shows an embodiment of a writing instrument and ink device as described herein, showing the tip, and balls of a ball point nib.

In certain embodiments, as shown, for example, in FIG. 2 and FIG. 3 a tip 3 herein comprises, at its tip end 9, one or more holes 6 through which a nib 5 can be inserted, such that at least a portion of the nib 5 protrudes from the narrowest part of the tip 3 to touch the writing substrate when used to write. A tip end can be, at its simplest, one hole (such as would be the case with a basic ball point pen that has only one ink cartridge dispensing one color of ink); or multiple holes to accommodate multiple nibs. Thus, in various embodiments of the current technology, the tip end 9 can contain multiple holes, such that multiple nibs 5 can be inserted and maintain a desirable separation therebetween. For example, as shown in FIG. 2 through FIG. 4, in certain embodiments, the tip end 9 is at least partially solid, with holes 6 disposed along the solid portion, such that the multiple nibs 5 can protrude through the holes. In other embodiments, the tip end includes an opening large enough to accommodate multiple nibs at once, which can lie adjacent to each other in a bundle with no solid portion separating them.

In some embodiments, for example, as shown in FIG. 1 through FIG. 4, the nibs are ball point pen nibs 5, so a ball 7 is held within a hole 6, with the remainder of the cartridge 8 extending upward through the length of the barrel 2. Nibs The technology herein is not limited to nibs having a ball, such as with a ball point pen. As shown in, for example, FIG. 5 through FIG. 7 and FIG. 9 through FIG. 11, in certain embodiments, the one or more nibs in an ink device or writing instrument herein, that protrude through the hole in the tip end, can be a soft point such as a felt tip or marker or brush, a hard point or sharp point such as a fountain pen tip or stylus tip, dip pen tip, or quill tip, or any other material that is sufficient to transfer a flow of ink from the cartridge onto the substrate, or in the case of a stylus, sufficient to transfer a signal to a touch sensitive surface.

Figure 7:
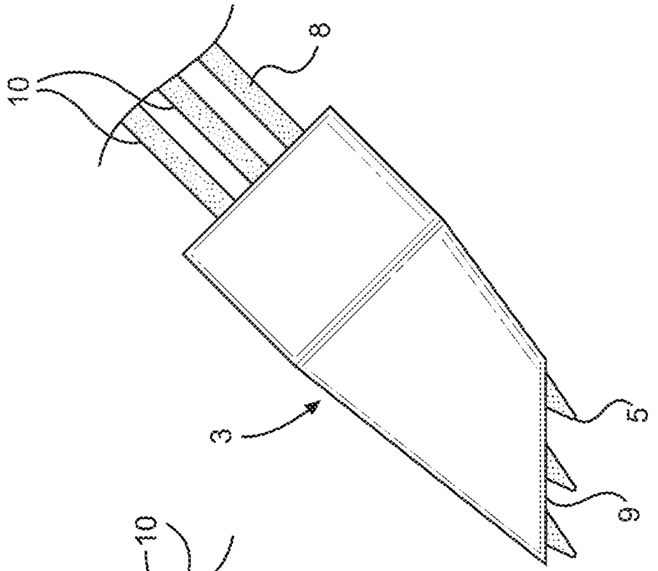
FIG. 7 is a side view of another embodiment herein, including a tip with a particular type of nib herein.
Figure 6:
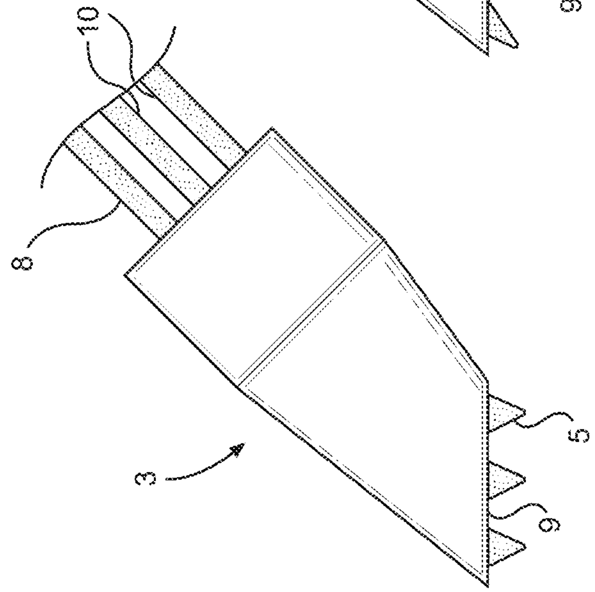
FIG. 6 is a side view of another embodiment herein, including a tip with a particular type of nib herein.
Figure 5:
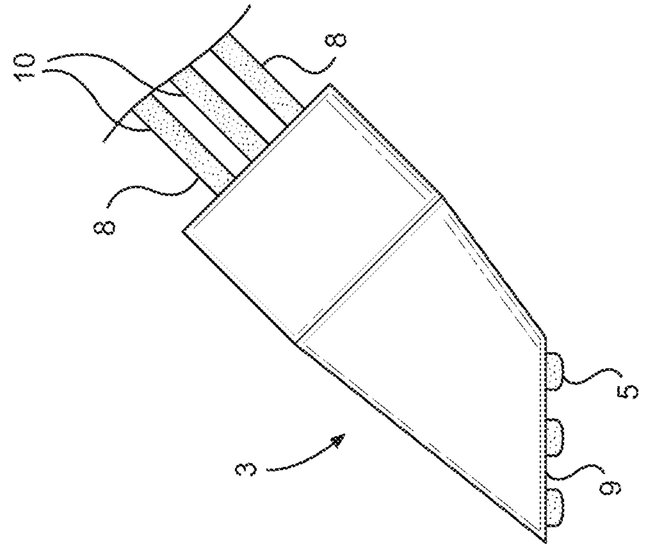
FIG. 5 is a side view of another embodiment herein, including a tip with a particular type of nib herein.
Figure 8:
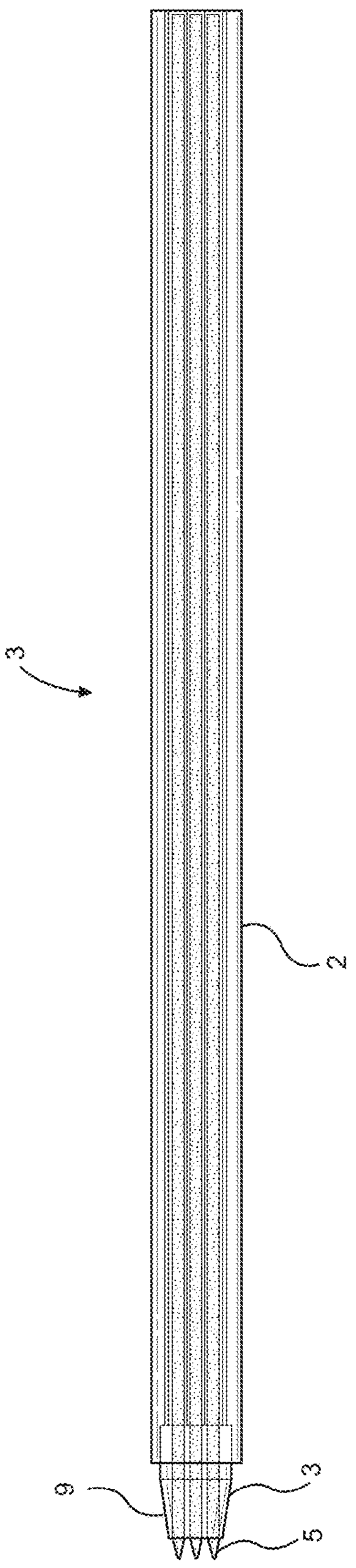
FIG. 8 shows an embodiment of a writing instrument and ink device as described herein, illustrating three (of five) cartridges, a tip, and balls of a ballpoint nib, with a tip that is translucent or transparent, and through which the nibs can be viewed.
Figure 11:
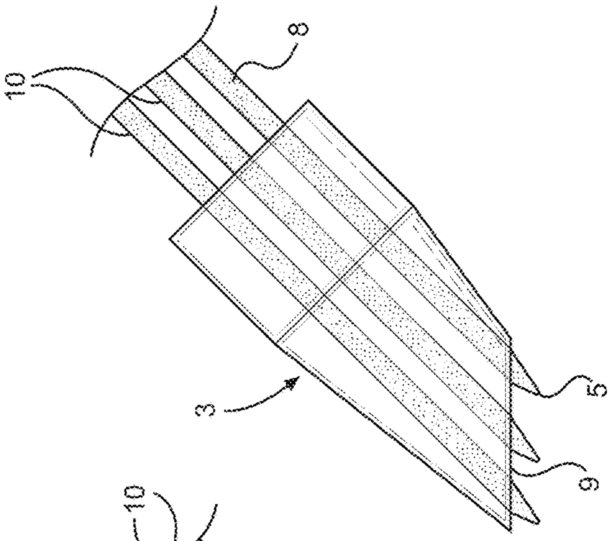
FIG. 11 is a side view of another embodiment herein, including a tip that is translucent or transparent, and through which the nibs can be viewed.

As shown in the embodiments in FIG. 5 through FIG. 7, in certain embodiments a substantially triangular or substantially trapezoidal tip 3, can have two or more ink cartridges 8 comprising a proximal end with a nib 5 and a distal portion 10, proximal end disposed within the tip 3, and configured to contemporaneously transfer ink from the two or more ink cartridges to a substrate through the nib, and one or more (or each of) the ink cartridges having a different physical characteristic from the other ink cartridges.

In certain embodiments, for example as shown in FIG. 5, one or more of the nibs 5 at the proximal ends of the ink cartridges or stylus 8 are at a substantially perpendicular angle relative to the distal portions of the ink cartridges 10.

In various embodiments, the nibs 5 are configured such that they can be moved around relatively easily—that is, the order and orientation of the colors can be switched as desired by the user—either by using ordinary manual force to remove them from the holes 6 and reconfigure them and then insert them into different holes; or by manual depression of a latch or lever that switches the configuration of the nibs; or merely by shifting them around (in the embodiments that do not include a flat surface with multiple holes but rather just a single hole through which all of the nibs protrude or extend to contact the substrate). In other embodiments, the tip comprises a hole corresponding to each of the nibs, through which each individual nib extends to contact the substrate.

In other embodiments, the nibs are substantially permanently fixed into holes as determined during manufacture of the writing instrument or ink device, and cannot easily be altered by the user; or in the embodiments that do not include a flat surface with multiple holes, the nibs are held together in some other way that makes it difficult to shift their position through ordinary manual force (e.g., by mechanically binding the plurality of nibs together, either near the proximal end of the writing instrument, or farther away toward the distal end; or by configuring them inside the barrel in a "tight" configuration that does not allow for much movement). As used herein, "ordinary manual force" means customary and typical force that can be exerted by an adult or child with just the use of hands, and with no external assistance.

In certain embodiments of an ink device or a writing instrument herein, each nib is connected to the proximal end of an ink cartridge, wherein the ink device is configured such that, when placed within the barrel of the writing instrument, the plurality of nibs extend through the proximal end of the barrel and transfer the ink from the cartridges to a substrate contemporaneously, providing a discernible effect of two or more physical characteristics.

As used herein, "contemporaneously" means in the same period of time, but not necessarily exactly simultaneously. Specifically, if a user uses a writing instrument herein by drawing the writing instrument along a substrate such as a piece of paper, if ink or signal flows from two or more nibs at any time during the stroke, this qualifies as "contemporaneously" transferring the ink or signal from the different nibs to the substrate.

In certain embodiments herein, an ink device or writing instrument herein can comprise nibs of different sizes, to provide inks or signals of different effect. In certain embodiments, the ink that is transferred to the substrate from two or more different nibs provides a discernible effect of two or more characteristics. As used herein, "characteristics" mean any features that are distinguishably discernible by a user. These can include physical characteristics. As used herein, "physical characteristics" means characteristics that are discernible by a user through the eye, ear, mouth, or touch—for example, color, brightness, fluorescence, reflectivity, smell, smoothness or roughness, viscosity, erasability, or permanence. Thus, in some exemplary embodiments, different cartridges can provide inks with different visual characteristics such as different appearances (e.g., different colors, brighter versus muted colors, glitter, thickness of line); or different olfactory characteristics such as different smells; or different tactile characteristics such as viscosity of ink; or any different characteristics such as erasable ink versus permanent ink or the like. Any feature that can discern at least two of the inks from each other can be desirable for a user. In certain embodiments the discernable effect can be a spatial separation and the physical characteristics transferred to the substrate from the nibs can be the space between the ink, created by the spatial relationship of the nibs.

Nib Angle

As can be seen, for example, in FIG. 1 and FIG. 2, in certain embodiments, the portion of the nib 5 protruding from the tip 3 at the tip end 9, is substantially perpendicular to the surface of the writing substrate. In such embodiments, the user can hold the writing instrument in a substantially perpendicular manner, in order to ensure that all of the nibs (the balls, in the case of a ball point pen) touch the surface adequately, thereby maintaining a desirable visual effect when the ink touches the substrate, in that all of the different colors or effects of the different nibs are shown. This can be helpful in the case of a substrate that is not a flat or substantially horizontal surface—for example, a wall or ceiling or the like. This can also be helpful in an embodiment in which a writing instrument is being held and used by a mechanical apparatus, such as a robot arm.

In other embodiments, a proximal end of one or more nibs is angled such that, when placed within the barrel (e.g., within the tip) of the writing instrument, the plane formed by the proximal ends of the nibs is substantially parallel to the surface of a substrate when the writing instrument is held at a particular angle relative to the surface of the substrate. This can be seen, for example, in FIG. 5 and FIG. 6. This can make it easier for a user to use the writing instrument to write on a flat or substantially horizontal surface. In various embodiments, this angle can be 30 to 150 degrees, 50 to 120 degrees, or 65 to 115 degrees, relative to the surface of the substrate.

In various embodiments, the tip itself can include an axial opening that is angled—that is, one or more of a plurality of nibs in an ink device or writing instrument herein comprises an axial opening that is angled, such that the axial opening is substantially parallel to the surface of a substrate when the writing instrument is held at an angle. As can be seen from FIG. 4 through FIG. 6, whether or not the nibs are also angled, the tip 3 need not be conically shaped, but rather, can be angled in a manner that provides for ease of use by the user. In certain embodiments, one or more of the nibs comprises an axial opening in which a ball is held in a manner such that the ball rotates when moved against a substrate, thereby transferring ink to the substrate.

Figure 10:
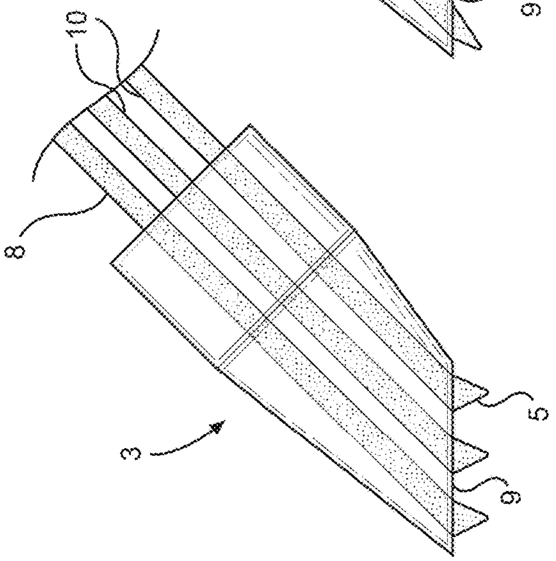
FIG. 10 is a side view of another embodiment herein, including a tip that is translucent or transparent, and through which the nibs can be viewed.
Figure 9:
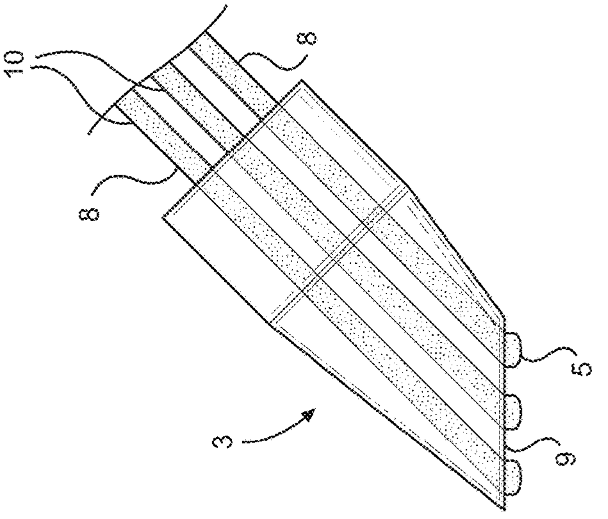
FIG. 9 is a side view of another embodiment herein, including a tip that is translucent or transparent, and through which the nibs can be viewed.

In other embodiments, the tip itself is angled, i.e., the tip end can be angled, to facilitate ease of use. In various embodiments, one or more or all of the tip or any of the nibs may or may not be angled. For example, in certain embodiments, it may not be necessary to angle any of the nibs, but merely to configure one or more of them in at different lengths within the barrel, so that an array of nibs can overall create a flat plane where the individual nibs are still substantially straight along their lengths, for example, as seen in FIG. 6 and FIG. 10.

Writing Instrument

As discussed above, in certain embodiments, a writing instrument herein is configured to include an ink device as described herein. In certain embodiments, a writing instrument can include a barrel that includes other items, e.g., a spring, a mechanical apparatus to facilitate switching of different features of an ink device herein, such as the cartridges, nibs, or ink colors. In certain embodiments, other features can be incorporated into a writing instrument herein, including, for example, an eraser, ink having special features (e.g., visual features such as fluorescence or glitter, ink that provides a particular smell, or disappearing ink).

In certain embodiments, a writing instrument herein comprises an electronic stylus having a retracted position and an extended position. In certain embodiments, a writing instrument herein can comprise one or more of: (a) an electronic stylus having a retracted position and an extended position; or (b) a ball point ink cartridge having a retracted position and an extended position; or (c) a housing, wherein the electronic stylus and the ball point ink cartridge are configured within a barrel of the writing instrument to be individually selectable to cause the electronic stylus and the ball point ink cartridge to move from a retracted position to an extended position and from an extended position to a retracted position.

Although the present technology has been described in relation to embodiments thereof, these embodiments and examples are merely exemplary and not intended to be limiting. Various modifications and alterations to the described embodiments will be apparent to those skilled in the art. The present technology should, therefore, not be limited by the specific disclosure herein, and can be embodied in other forms not explicitly described here, without departing from the spirit thereof.

What is claimed is:

1. An ink device for a writing instrument having a barrel, the ink device being configured to be enclosed within the barrel, the ink device comprising:

(a) two or more ink cartridges, each of the ink cartridges containing ink; each of the ink cartridges having a proximal end and an opposite distal end; and (b) two or more nibs, each nib connected to the proximal end of said two or more ink cartridges, wherein a proximal end of one or more nibs is angled such that, when placed within the barrel of the writing instrument, a plane formed by the proximal ends of the nibs is substantially parallel to the surface of a substrate when the writing instrument is held at an angle of 30 to 150 degrees relative to the surface of the substrate, and wherein the ink device is configured such that, when placed within the barrel of the writing instrument, the plurality of nibs are disposed radially around a center nib and extend through a proximal end of the barrel and transfer the ink from the cartridges to a substrate contemporaneously, providing a discernible effect of two or more characteristics.

2. The ink device of claim 1, wherein each of the ink cartridges contain ink having different visual, tactile, or olfactory characteristics.

3. The ink device of claim 2, wherein the different visual, tactile, or olfactory characteristics of the ink are one or more of: color, brightness, fluorescence, reflectivity, smell, smoothness or roughness, viscosity, erasability, or permanence.

4. The ink device of claim 1, wherein the nibs each comprise an axial opening in which a ball is held in a manner such that the ball rotates when moved against a substrate, thereby transferring ink to the substrate.

5. A method for writing on a substrate, the method comprising contacting an ink device of claim 1 with the substrate for a period of time sufficient for ink to flow from the ink device onto the substrate.

6. A writing instrument comprising:

(a) a tip, the tip having a proximal end and an opposite distal end, the tip tapering from a first diameter at the distal end to a second, narrower diameter at the proximal end, wherein the proximal end of the tip is angled such that a plane formed by the proximal end of the tip is substantially parallel to the surface of a substrate when the writing instrument is held at an angle of 30 to 150 degrees relative to the surface of the substrate;

(b) two or more ink cartridges disposed within the tip, each of the ink cartridges comprising a proximal end connected to or integrated with a nib configured to transfer ink from within the two or more ink cartridges to a substrate, and each of the ink cartridges having a different physical characteristic from the at least one other ink cartridge;

wherein the writing instrument is configured such that, when the two or more nibs are contacted with a substrate, the plurality of nibs extend through a proximal end of the tip and transfer the ink from the cartridges to a substrate contemporaneously, providing a discernible effect of two or more physical characteristics.

7. The writing instrument of claim 6, wherein a proximal end of one or more nibs is angled such that, when placed within the tip of the writing instrument, a plane formed by the proximal ends of the nibs is substantially parallel to the surface of a substrate when the writing instrument is held at an angle of 30 to 150 degrees relative to the surface of the substrate.

8. The writing instrument of claim 6, wherein the tip comprises a single hole through which all of the nibs extend to contact the substrate.

9. The writing instrument of claim 6, wherein the tip comprises a hole corresponding to each of the nibs, through which each individual nib extends to contact the substrate.

10. The writing instrument of claim 6, wherein one or more of the nibs contains an axial opening in which a ball is held.

11. The writing instrument of claim 6, wherein the substrate is adapted to be paper, wood, glass, metal, fabric, or polymer.

12. A writing instrument comprising:

(a) a substantially triangular tip; and (b) two or more ink cartridges disposed within the tip, each of the ink cartridges comprising a proximal end and a distal portion, the proximal end connected to or integrated with a nib and configured to contemporaneously transfer ink from the two or more ink cartridges to a substrate;

each of the ink cartridges having a different physical characteristic from the other ink cartridge;

wherein the tip comprises a hole corresponding to each of the nibs, through which each individual nib extends to contact the substrate.

13. The writing instrument of claim 12, wherein the proximal ends of the ink cartridges are at a substantially perpendicular angle to the distal portions of the ink cartridges.

* * * * *